United States Patent
Sotek et al.

(10) Patent No.: US 10,069,552 B2
(45) Date of Patent: Sep. 4, 2018

(54) ANTENNA DEVICE AND METHOD FOR DRIVING ANTENNA PORTS OF AN ANTENNA ARRAY

(71) Applicant: Huawei Technologies Co., Ltd., Shenzhen (CN)

(72) Inventors: Karel Sotek, Munich (DE); Songhai Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/068,496

(22) Filed: Mar. 11, 2016

(65) Prior Publication Data

US 2016/0197661 A1 Jul. 7, 2016

Related U.S. Application Data

(63) Continuation of application No. PCT/EP2013/068827, filed on Sep. 11, 2013.

(51) Int. Cl.
| | |
|---|---|
| *H04K 1/10* | (2006.01) |
| *H04B 7/06* | (2006.01) |
| *H04B 7/0408* | (2017.01) |
| *H04B 7/0491* | (2017.01) |
| *H04B 7/08* | (2006.01) |
| *H04L 27/36* | (2006.01) |

(52) U.S. Cl.
CPC ......... *H04B 7/0617* (2013.01); *H04B 7/0408* (2013.01); *H04B 7/0491* (2013.01); *H04B 7/0634* (2013.01); *H04B 7/0848* (2013.01); *H04L 27/362* (2013.01)

(58) Field of Classification Search
CPC . H04B 1/40; H04B 3/23; H04B 1/403; H04B 3/54; H04L 27/2601; H04L 1/0025; H04L 25/4902; H04L 1/0009; H04L 1/0041; H04L 25/49; H04L 27/2647; H04L 5/0007; H04L 27/2657; H04L 27/2662; H04L 5/0048; H04L 1/0003; H04L 1/0071
USPC .......................... 375/260, 259, 295, 219, 316
See application file for complete search history.

(56) References Cited

U.S. PATENT DOCUMENTS

| | | |
|---|---|---|
| 2010/0060522 A1 | 3/2010 | Backlund et al. |
| 2011/0150050 A1 | 6/2011 | Trigui et al. |
| 2011/0212695 A1 | 9/2011 | Wild et al. |

(Continued)

FOREIGN PATENT DOCUMENTS

| | | |
|---|---|---|
| CN | 101569058 A | 10/2009 |
| JP | 2000341193 A | 12/2000 |

(Continued)

*Primary Examiner* — Zewdu Kassa
(74) *Attorney, Agent, or Firm* — Leydig, Voit & Mayer, Ltd.

(57) ABSTRACT

The disclosure relates to an antenna device, configured to assign antenna beams to radio cells, the antenna device comprising: a set of radio transceivers coupleable to a set of antenna ports of an antenna array, each radio transceiver being configured to drive a respective antenna port of the antenna array when each radio transceiver is coupled to the respective antenna port, wherein the set of radio transceivers is configured to drive the antenna ports to generate at least two antenna beams, wherein each radio transceiver contributes to the generation of each antenna beam.

18 Claims, 4 Drawing Sheets

(56) References Cited

U.S. PATENT DOCUMENTS

| | | | | |
|---|---|---|---|---|
| 2012/0264469 A1* | 10/2012 | Dartois | ................ | H04B 7/0408 |
| | | | | 455/509 |
| 2013/0272437 A1* | 10/2013 | Eidson | ................. | H04B 7/0413 |
| | | | | 375/267 |
| 2014/0225777 A1* | 8/2014 | Harel | ....................... | H01Q 3/00 |
| | | | | 342/373 |

FOREIGN PATENT DOCUMENTS

| JP | 2002261670 A | 9/2002 |
|---|---|---|
| JP | 2011188445 A | 9/2011 |
| JP | 2012502525 A | 1/2012 |
| JP | 2012530436 A | 11/2012 |
| WO | WO 0143229 A2 | 6/2001 |
| WO | WO 0219470 A1 | 3/2002 |
| WO | WO 2004057758 A1 | 7/2004 |

* cited by examiner

ANTENNA DEVICE AND METHOD FOR DRIVING ANTENNA PORTS OF AN ANTENNA ARRAY

CROSS-REFERENCE TO RELATED APPLICATIONS

This application is a continuation of International Patent Application No. PCT/EP2013/068827, filed on Sep. 11, 2013, which is hereby incorporated by reference in its entirety.

TECHNICAL FIELD

The present disclosure relates to an antenna device and a method for driving antenna ports of an antenna array. The disclosure further relates to application of base transceiver station (BTS) antenna beam forming in a cellular network. In particular, the present disclosure relates to maximizing the capacity of vertical or horizontal cell splitting.

BACKGROUND

Broad acceptance and extensive usage of mobile broadband services put enormous pressure on available cellular network radio resources. Expensive auctioned spectrum must be used efficiently. Vertical cell splitting is a way to increase the reuse pattern of the rare frequency spectrum. The BTS splits one cell into inner and outer cell. The BTS uses two narrow vertical antenna beams, one covering the inner and the other one the outer cell. This increases the maximum system capacity in spectrum limited network. Using active antenna array (AAA), there is a virtual split of the radio resources being available in the outer and inner cell. For example, the available total radio frequency (RF) output power of AAA can be flexibly split for serving the inner and outer cell. As the number of user equipments (UEs) or the throughput demand is changing between the inner and outer cells, the BTS can adjust the allocation via AAA accordingly.

FIGS. 1a and 1b show the scenarios 100a, 100b of a BTS 101 equipped with an AAA serving a cell area. To increase the network capacity, this cell area is split into inner cell 102 and outer cell 104. The inner cell 102 and outer cell 104 are served by separated beams 112, 114, which are formed by the AAA. As the traffic share between the inner cell 102 and outer cell 104 is changing depending on traffic and number of users, the AAA is adaptively adjusting the split of its available radio resources assigned to each of the inner cell 102 and outer cell 104. The radio resources are for example the BTS RF output power. The resource split ratio between the inner cell 102 and outer cell 104 is controlled by BTS 101 measuring the combination of traffic throughput and transmit power demand in each of the inner cell 102 and outer cell 104. FIGS. 1a and 1b show two extreme examples of BTS power distribution for all UEs 103, 105, 107 either in outer cell 104, according to FIG. 1a, or in inner cell 102, according to FIG. 1b. The cell split can be either vertical (as shown in FIGS. 1a and 1b: inner and outer cell) or horizontal (as shown in FIG. 2: left and right cell) depending on AAA used.

FIG. 2 shows the horizontal cell split scenario 200 of a BTS 201 equipped with an AAA serving a cell area. To increase the network capacity, this cell area is split into left cell 202 and right cell 204. The left cell 202 and right cell 204 are served by separated beams 212, 214, which are formed by the AAA. FIG. 2 shows an example of BTS power distribution where a first part of the UEs 203, 205 are located in the left cell 202 and a second part of the users 207, 209 are located in the right cell 204.

For both cell split scenarios as shown in FIGS. 1a, 1b and 2, the legacy implementation of vertical or horizontal cell split implements a fixed allocation of available radio resources. For example, two passive antennas with different tilts are served via two separated radio transceivers. The RF output of these two transceivers is fixed with respect to the inner and outer cells.

As the radio modules and antennas are separated, there is no possibility for a neighboring cell (neighboring radio module and antenna) to "borrow" its unused resources. A low-loaded or no-load cell cannot give its unused resources to another collocated radio cell.

As an example, two cells are created by collocated two passive antennas and two radio transceivers. Both transceivers are dimensioned to deliver 20 W RF output power each, in order to serve the maximum cell capacity. In the case of one of the two cells being overloaded, limited by available RF power, this overloaded cell cannot "borrow" the RF output power from the collocated second cell.

SUMMARY

It is the object of the disclosure to provide a technique for an improved driving of antenna arrays.

This object is achieved by the features of the independent claims. Further implementation forms are apparent from the dependent claims, the description and the figures.

The disclosure is based on the finding that a technique for improved driving of antenna arrays can be achieved by pooling the RF output of the transceivers between inner and outer cells, or left and right cells.

That is, the RF power of the antenna may be shared in a pool and its distribution may be controlled according to a specific formula as described below. Using this approach, the active antenna can pool its RF output power resources between the cells. This allows for higher efficiency of the antenna hardware and also reduces the power consumption of the active antenna unit.

In order to describe the disclosure in detail, the following terms, abbreviations and notations will be used:
BTS: base transceiver station
AAA: active antenna array
VCS: vertical cell split
HCS: horizontal cell split
TRX: radio transceiver According to a first aspect, the disclosure relates to an antenna device, configured to assign antenna beams to radio cells, the antenna device comprising: a set of radio transceivers coupleable to a set of antenna ports of an antenna array, each radio transceiver being configured to drive a respective antenna port of the antenna array when each radio transceiver is coupled to the respective antenna port, wherein the set of radio transceivers is configured to drive the antenna ports to generate at least two antenna beams, wherein each radio transceiver contributes to the generation of each antenna beam.

When the set of radio transceivers drive the antenna ports to generate at least two antenna beams, wherein each radio transceiver contributes to the generation of each antenna beam, the RF output of the transceivers may be pooled between radio cells implementing a flexible structure of improved antenna beam driving.

In a first implementation form of the antenna device according to the first aspect, the antenna device is configured to assign the antenna beams to radio cells according to one of the following cell configuration modes: vertical cell split mode, and horizontal cell split mode.

The pooled architecture thus can be applied to both split modes: VCS and HCS. The device can thus be flexibly applied to different environments.

In a second implementation form of the antenna device according to the first aspect as such or according to the first implementation form of the first aspect, the antenna device comprises a combination unit configured to provide each radio transceiver with a combination of a set of user signals.

The combination unit can allow flexible assignment of the user signals to the transceivers.

In a third implementation form of the antenna device according to the second implementation form of the first aspect, the combination unit comprises a set of weighting units configured to weight each user signal with a respective weight.

When weighting each user signal with a respective weight, the device may map the user signal to a respective radio cell or to multiple radio cells.

In a fourth implementation form of the antenna device according to the third implementation form of the first aspect, the set of weighting units is configured to provide a user-individual amplitude coefficient to each user signal.

By applying a user-individual amplitude coefficient to each user signal, each user can be treated separately.

In a fifth implementation form of the antenna device according to the fourth implementation form of the first aspect, the combination unit comprises: a summing unit configured to sum the weighted user signals, providing a sum user signal; and a distribution unit configured to distribute the sum user signal to each of the radio transceivers.

The summing unit can allow to combine all user signals and the distribution unit can allow to distribute the user signals to the transceivers in order to have a flexible assignment of users to radio cells.

In a sixth implementation form of the antenna device according to the fifth implementation form of the first aspect, a power of the sum user signal corresponds to a total radio frequency output power of all radio transceivers.

When the sum user signal corresponds to a total radio frequency output power, the power of the antenna array can be optimally used.

In a seventh implementation form of the antenna device according to the fifth or the sixth implementation form of the first aspect, the distribution unit is configured to apply a vector modulation to the sum user signal before distributing it to the radio transceivers.

A vector modulation can be efficiently realized, e.g. by a multiplication.

In an eighth implementation form of the antenna device according to the seventh implementation form of the first aspect, the vector modulation comprises parameter sets according to radio cells the at least two antenna beams are assigned to.

By using those parameter sets, the user signals can be flexibly assigned to specific radio cells.

In a ninth implementation form of the antenna device according to the eighth implementation form of the first aspect, the parameter sets correspond to amplitude and phase multiplication.

Amplitude and phase multiplication can be efficiently implemented, e.g. by a lookup table.

In a tenth implementation form of the antenna device according to any of the fourth to the ninth implementation forms of the first aspect, the antenna device is configured to provide a sum of the squared user-individual amplitude coefficients for all user signals, the sum being assigned to one of the radio cells, such that the sum is smaller than or equal to a total radio frequency output power of all radio transceivers.

When providing the sum such that the sum is smaller than or equal to a total radio frequency output power of all radio transceivers, the energy radiated to each radio cell can be flexibly controlled.

In an eleventh implementation form of the antenna device according to the tenth implementation form of the first aspect, the antenna device is configured to limit a transmit signal of the set of radio transceivers if the sum of the squared user-individual amplitude coefficients for all user signals is higher than the total radio frequency output power.

By limiting the transmit signal, a non-linear driving of the transceivers can be avoided.

According to a second aspect, the disclosure relates to a radio base transceiver station, comprising: an active antenna array being capable of beam forming; and an antenna device according to the first aspect as such or according to any of the preceding implementation forms of the first aspect, wherein each of the radio transceivers is coupled to an antenna port or to a group of antenna ports of the antenna array.

The device can thus be implemented in any radio base transceiver station with an active antenna array.

According to a third aspect, the disclosure relates to a method for sharing a radio frequency output power of a set of radio transceivers between antenna beams, the set of radio transceivers being coupleable to a set of antenna ports of an antenna array, wherein each radio transceiver is configured to drive a respective antenna port when each radio transceiver is coupled to the respective antenna port, the method comprising: driving, by the set of radio transceivers, the antenna ports to generate at least two antenna beams, wherein each radio transceiver contributes to the generation of each antenna beam.

When the set of radio transceivers drive the antenna ports to generate at least two antenna beams, wherein each radio transceiver contributes to the generation of each antenna beam, the RF output of the transceivers may be pooled between radio cells implementing a flexible structure of improved antenna beam driving.

In a first implementation form of the method according to the third aspect, the method comprises: combining a set of amplitude weighted user signals to obtain a combined user signal; and distributing the combined user signal to the set of radio transceivers, wherein the combined user signal is passed through a vector modulation comprising vector parameter sets according to cells, the at least two antenna beams are assigned to, before being distributed to the set of radio transceivers.

The combining can thus allow flexible assignment of user signals to radio cells.

BRIEF DESCRIPTION OF DRAWINGS

Further embodiments of the disclosure will be described with respect to the following figures, in which.

DETAILED DESCRIPTION OF EMBODIMENTS

Figure 3:
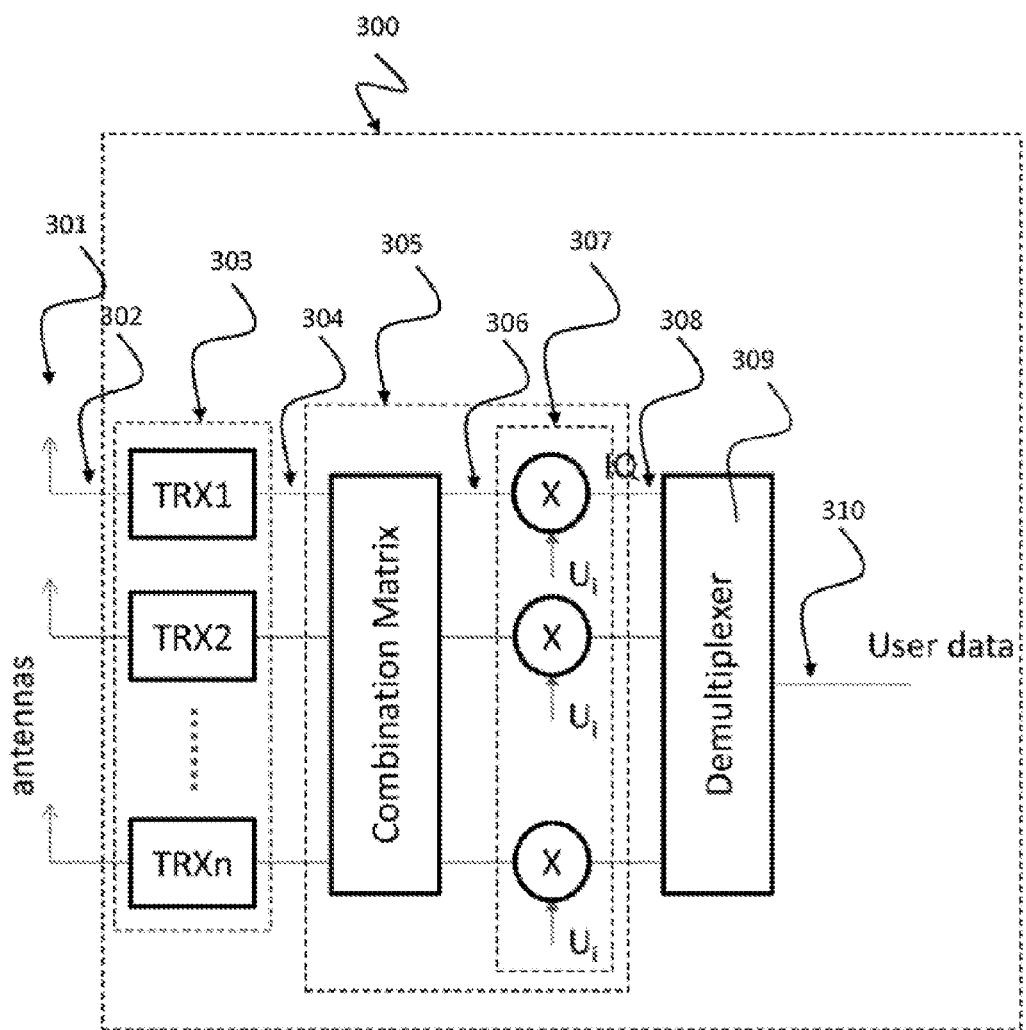
FIG. 3 shows a block diagram of an antenna device 300 for driving antenna ports of an antenna array, according to an embodiment of the disclosure.

FIG. 3 shows a block diagram of an antenna device 300 for driving antenna ports 302 of an antenna array 301, according to an embodiment of the disclosure. The antenna device 300 implements an AAA architecture.

The antenna device 300 being configured to assign antenna beams to radio cells includes a set of radio transceivers 303 coupleable to a set of antenna ports 302 of an antenna array 301, each radio transceiver 303 being configured to drive a respective antenna port 302 of the antenna array 301 when each radio transceiver is coupled to the respective antenna port 302. The set of radio transceivers 303 is configured to drive the antenna ports 302 to generate at least two antenna beams, wherein each radio transceiver 303 contributes to the generation of each antenna beam.

Figure 1A:
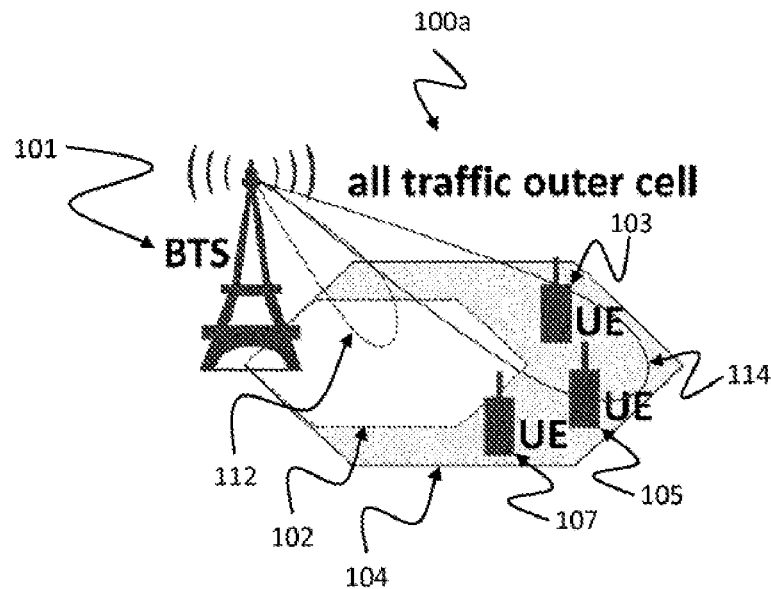
FIGS. 1a and 1b show vertical cell split scenarios 100a, 100b of a BTS 101 equipped with an AAA serving a cell area.
Figure 1B:
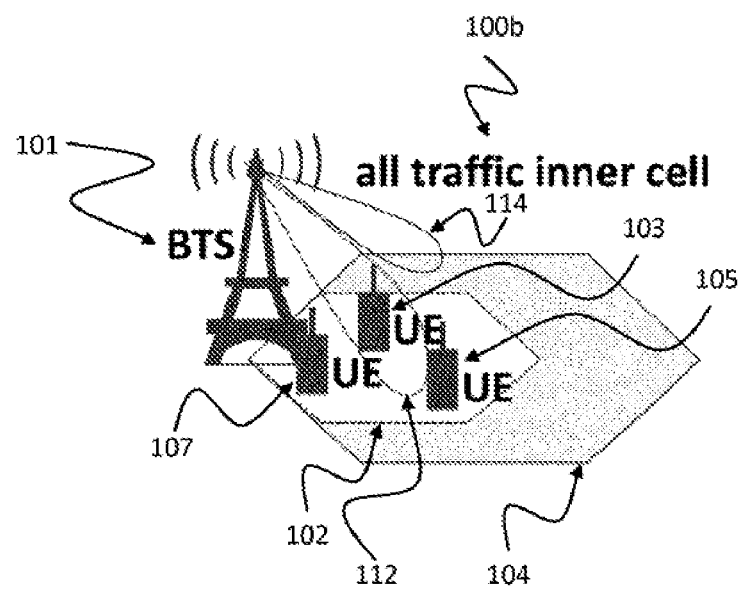

The AAA 301 includes an array of antenna elements driven by a set of radio transceivers 303. The AAA 301 may generate two separate antenna beams. One beam may cover the outer part of a cell, the other one may cover the inner part of a cell, as depicted above with respect to FIGS. 1a and 1b. VCS increases the maximum achievable network capacity, if limited by the available spectrum. Both inner and outer cell beams are created by the TRX set 303. For the transmission, each TRX 303 contributes in a same way to the inner and outer beam creation. So their available output power is shared in a pool for all the inner and outer cell users.

Due to the pooling the total RF output power available in the inner and outer cell has no fixed limit. Instead, only the sum of both inner and outer cell output power is limited, thus allowing for flexible split adjustment between the portions of the RF output power use in the inner or outer cell. Thus, if the RF power demand is unequally distributed and/or dynamically changing between the inner and outer cell, the BTS can adopt to the current demand.

The adoption can be achieved by applying a user-individual amplitude coefficient $U_i$ 307 to each user's IQ baseband data 308. The sum of all the user data amplitudes corresponds to the total RF output power of all TRXs 303. Thus the sum of $Qi^2$, Qi being the amplitude coefficient of user i IQ signal 308, assigned in one cell to one set of TRXs 303 must correspond to the sum of their RF output power, total RF output power, according to the formula: $\Sigma_{i=1}^{n} Qi^2 \leq \text{Total\_RF\_output\_power}$, where Qi is the amplitude coefficient of user i IQ signal 308, n is the number of users in one cell, split via VCS or HCS, and Total_RF_output_power is the sum of RF output power of all TRXs 303. If the sum of $Qi^2$ assigned is higher than the total RF output power, the transmit signal will be clipped, and thus limited. If this sum is lower, part of the TRX power resources is unused. This happens in low data traffic situation.

The BTS implements an antenna array driven by a set of radio transceivers, TRXs, 303 as described above. The TRXs 303 modulate and transmit the user data 310 represented by IQ signals 308. User data 310 passes a demultiplexer 309 to generate the user IQ signals 308. User IQ signals 308 are passing a Combination Matrix 305. The Combination Matrix 305 internally builds up a sum signal 304 of all user's IQ signals 308. Each individual user IQ signal 308 is multiplied by his individual Qi amplitude factor 307 providing an individually weighted user IQ signal 306. Then, the sum signal 304 of all individually weighted user IQ signals 306 is distributed to each of the TRXs 303. For this distribution, each TRX 303 gets this sum after passing a vector modulation (amplitude and phase multiplication) with different vector parameter sets. One parameter set, per TRX 303, is commonly used for inner cell users and another one for the outer cell users in VCS scenario. For HCS scenario, inner/outer cell is to be replaced by left/right cell.

The internal sum signal of all user's IQ signals 308 may correspond to the total RF output power of all TRXs 303. Thus this total RF output power may be pooled by all users.

Figure 2:
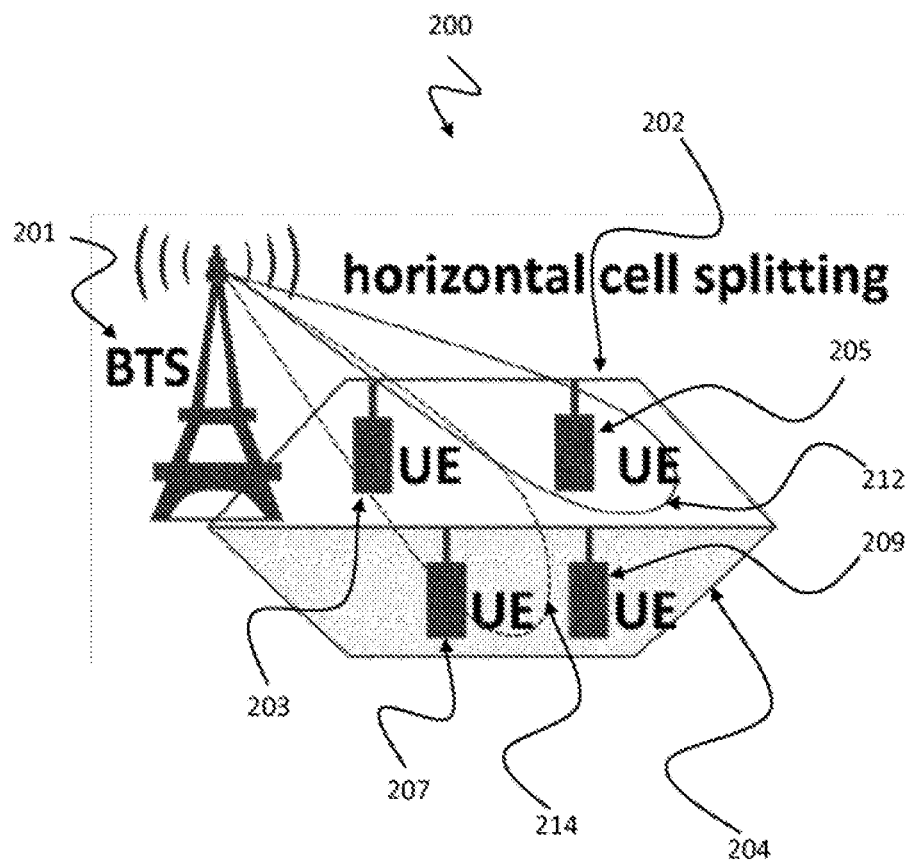
FIG. 2 shows the horizontal cell split scenario 200 of a BTS 201 equipped with an AAA serving a cell area.

Thus, the antenna device 300 may form a pooled RF output power resource and a flexible sharing of this RF output power pool. Pool building is achieved by implementing an AAA architecture as shown in FIGS. 1 to 3. The pooled RF output power can be used either for VCS in case of AAA architecture being a single-column, or HCS in case of AAA architecture being a multi-column. Pool sharing may be achieved by building a sum signal via an amplitude modulation or amplitude multiplication of each individual user IQ signal 308 by his individual Qi amplitude factor 307.

With respect to a traditional cell split solution where two separate TRXs are used for inner/outer or left/right split cell and thus the individual Qi amplitude factor is pooled only between the inner cell users or between the outer cell users, and left/right cell users, respectively, the antenna device 300 illustrated in FIG. 3 implementing an AAA architecture can offer twice the power range for the Qi pool compared with the two separate TRXs solution. Also the user pool can be much larger, depending on the user distribution within the cell.

In order to achieve an optimum usage of the TRX output power of the AAA architecture, the sum of $Qi^2$ assigned in one cell to one set of TRXs should correspond to the sum of their RF output power, total RF output power, according to the formula: $\Sigma_{i=1}^{n} Qi^2 \leq \text{Total\_RF\_output\_power}$, where Qi is the amplitude coefficient of user i IQ signal, n is the number of users in one cell, split via VCS or HCS, and Total_RF_output_power is the sum of RF output power of all TRXs. For example a set of four TRXs with 10 W RF output power provides 40 W Total_RF_output_power. If the sum of $Qi^2$ assigned is higher than the total RF output power, the transmit signal at antenna ports 302 can be clipped, and thus limited. If this sum is lower, part of the TRX power resources may be unused, this may happen in low data traffic situation.

The antenna device 300 may be configured to assign the antenna beams to radio cells according to one of the following cell configuration modes: vertical cell split mode, and horizontal cell split mode. The antenna device 300 may include a combination unit 305 being configured to provide each radio transceiver 303 with a combination of a set of user signals 308. The combination unit 305 may comprise a set of weighting units 307 configured to weight each user signal 308 with a respective weight $U_i$. The set of weighting units 307 may be configured to provide a user-individual amplitude coefficient Qi to each user signal 308. The combination unit 305 may comprise a summing unit that may be configured to sum the weighted user signals, providing a sum user signal. The combination unit 305 may comprise a distribution unit that may be configured to distribute the sum user signal to each of the radio transceivers 303. A power of the sum user signal may correspond to a total radio frequency output power of all radio transceivers 303. The distribution unit may be configured to apply a vector modulation to the sum user signal before distributing it to the radio transceivers 303. The vector modulation may include parameter sets according to radio cells the at least two antenna beams are assigned to. The parameter sets may correspond to amplitude and phase multiplication. The device 300 may provide a sum of the squared user-individual amplitude coefficients for all user signals, the sum being assigned to one of the radio cells, such that the sum is smaller than or equal to a total radio frequency output power of all radio transceivers 303. The antenna device 300 may be configured to limit a transmit signal of the set of radio transceivers 303 if the sum of the squared user-individual amplitude coefficients for all user signals is higher than the total radio frequency output power.

Further, a radio base transceiver station according to an embodiment comprises an active antenna array 301 being capable of beam forming, and an antenna device as described above, wherein each of the radio transceivers 303 is coupled to an antenna port 302 or to a group of antenna ports 302 of the antenna array 301.

Figure 4:
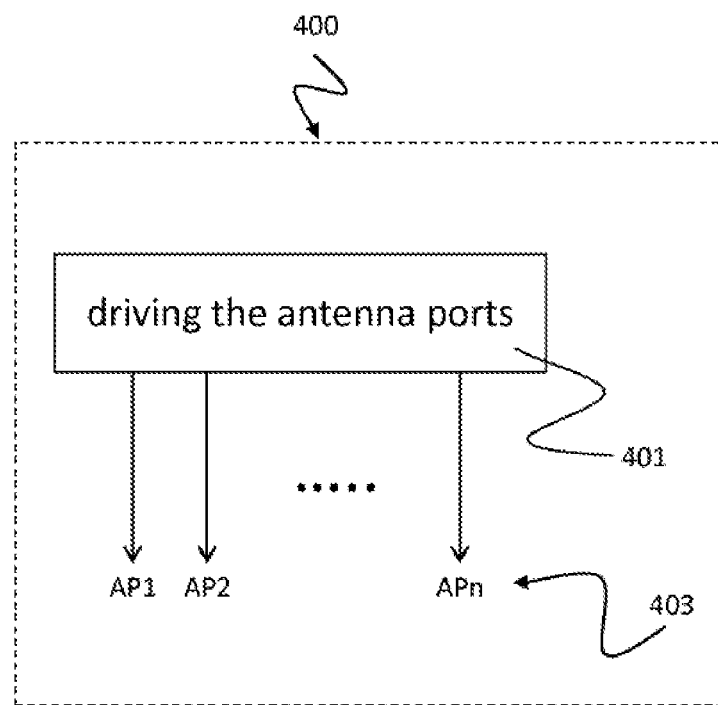
FIG. 4 shows a schematic diagram of a method 400 for driving antenna ports of an antenna array, according to an embodiment of the disclosure.

FIG. 4 shows a schematic diagram of a method 400 for driving antenna ports AP1, AP2, . . . , APn of an antenna array 403 according to an embodiment. The method 400 applies sharing a radio frequency output power of a set of radio transceivers, e.g. radio transceivers 303 as depicted in FIG. 3 described above, between antenna beams, the set of radio transceivers being coupleable to a set of antenna ports 302 of an antenna array 301. Each radio transceiver is configured to drive a respective antenna port when each radio transceiver is coupled to the respective antenna port. The method 400 includes driving 401, by the set of radio transceivers, the antenna ports 302 to generate at least two antenna beams, wherein each radio transceiver 303 contributes to the generation of each antenna beam.

According to an embodiment, the method 400 includes combining a set of amplitude weighted $U_i$ user signals 308 to obtain a combined user signal. According to an embodiment, the method 400 includes distributing the combined user signal to the set of radio transceivers 303. According to an embodiment, the combined user signal is passed through a vector modulation comprising vector parameter sets according to cells, the at least two antenna beams are assigned to, before being distributed to the set of radio transceivers 303.

The method 400 may be processed in an antenna device 300 as described above with respect to FIG. 3. The method 400 may be processed in a BTS applying vertical cell split as described above with respect to FIGS. 1a and 1b. The method 400 may be processed in a BTS applying horizontal cell split as described above with respect to FIG. 2.

The disclosure provides a BTS implementing AAA operating in VCS mode according to the representation of FIG. 1 described above. The disclosure provides a BTS implementing AAA operating in HCS mode according to the representation of FIG. 2 described above. The disclosure provides a BTS where the AAA can be implemented by a set of TRXs connected to a set of antennas as shown in FIG. 3 described above. Each TRX can connect to just one antenna or to a group of antennas connected via a passive network. The disclosure provides a BTS, where a RF output power pool of all TRXs can be built up by all TRXs using an internal sum signal of all users' IQ signals served by this BTS cell. The disclosure provides a BTS, where each user's IQ signal amplitude can be controlled by Qi amplitude factor as shown in FIG. 3 described above. The below formula may be used in order to achieve the maximum usage of RF output power provided by the pooled TRX set: $\Sigma_{i=1}^{n} Qi^2 \leq \text{Total\_RF\_output\_power}$.

From the foregoing, it will be apparent to those skilled in the art that a variety of methods, systems, computer programs on recording media, and the like, are provided.

The present disclosure can also support a computer program product including computer executable code or computer executable instructions that, when executed, causes at least one computer to execute the performing and computing steps described herein.

The methods and devices described in the present application may be implemented as software in a Digital Signal Processor, DSP, in a micro-controller or in any other side-processor or as hardware circuit within an application specific integrated circuit, ASIC.

The disclosure can be implemented in digital electronic circuitry, or in computer hardware, firmware, software, or in combinations thereof, e.g. in available hardware of conventional mobile devices or in new hardware dedicated for processing the methods described herein.

Many alternatives, modifications, and variations will be apparent to those skilled in the art in light of the above teachings. Of course, those skilled in the art readily recognize that there are numerous applications of the disclosure beyond those described herein. While the present disclosures has been described with reference to one or more particular embodiments, those skilled in the art recognize that many changes may be made thereto without departing from the scope of the disclosure. It is therefore to be understood that within the scope of the appended claims and their equivalents, the disclosure may be practiced otherwise than as specifically described herein.

What is claimed is:

1. An antenna device configured to assign antenna beams to a radio cells in a cellular network so as to split the radio cell into a plurality of split cells and thereby expand a channel capacity of the radio cell, the antenna device comprising:
   a set of radio transceivers coupleable to a set of associated antenna ports of an antenna array, wherein each radio transceiver is configured to drive its associated antenna port of the antenna array when each radio transceiver is coupled to its associated antenna port;
   a combination unit configured to provide each radio transceiver with a set of user signals that coordinate the driving of the antenna ports in order to control antenna beams generated by the antenna array to create the plurality of split cells; and
   the set of the radio transceivers is further configured to drive the set of the associated antenna ports to generate at least two antenna beams comprising the plurality of split cells, wherein each radio transceiver contributes its radio frequency output power to all of the at least two beams such that a fixed total radio frequency output power of the set of radio transceivers is adjustably distributed between the at least two beams.

2. The antenna device of claim 1, configured to assign the antenna beams to radio cells according to one of the following cell configuration modes:
   a vertical cell split mode, and
   a horizontal cell split mode.

3. The antenna device of claim 1, wherein the combination unit comprises a set of weighting units configured to weight each user signal with a respective weight.

4. The antenna device of claim 3, wherein the set of the weighting units is configured to provide a user-individual amplitude coefficient to each user signal.

5. The antenna device of claim 4, wherein the combination unit comprises:
a summing unit configured to sum the weighted user signals, providing a sum user signal; and
a distribution unit configured to distribute the sum user signal to each of the radio transceivers.

6. The antenna device of claim 5, wherein a power of the sum user signal corresponds to a total radio frequency output power of all radio transceivers.

7. The antenna device of claim 5, wherein the distribution unit is configured to apply a vector modulation to the sum user signal before distributing the sum user signal to the radio transceivers.

8. The antenna device of claim 7, wherein the vector modulation comprises parameter sets according to radio cells the at least two antenna beams are assigned to.

9. The antenna device of claim 8, wherein the parameter sets correspond to amplitude and phase multiplication.

10. The antenna device of claim 4, configured to provide a sum of squared user-individual amplitude coefficients for all user signals, wherein the sum is assigned to one of the radio cells, when the sum is smaller than or equal to a total radio frequency output power of all radio transceivers.

11. The antenna device of claim 10, configured to limit a transmit signal of the set of the radio transceivers when the sum of the squared user-individual amplitude coefficients for all the user signals is higher than the total radio frequency output power.

12. A radio base transceiver station comprising:
an active antenna array being capable of beam forming; and
an antenna device
configured to assign antenna beams to a radio cell in a cellular network so as to split the radio cell into a plurality of split cells and thereby expand a channel capacity of the radio cell, the antenna device comprises:
a set of radio transceivers, wherein each of the radio transceivers is (a) coupled to an antenna port or to a group of antenna ports of the antenna array and (b) configured to drive its associated antenna port of the antenna array; and
a combination unit configured to provide each radio transceiver with a set of user signals that coordinates the driving of the antenna ports in order to control the antenna beams generated by the antenna array to create the plurality of split cells,
wherein the set of the radio transceivers is configured to drive the set of the associated antenna ports to generate at least two antenna beams comprising the plurality of split cells, and wherein each radio transceiver contributes its radio frequency output power to all of the at least two beams such that a fixed total radio frequency output power of the set of radio tranceivers is adjustable distributed between the at least two beams.

13. A method for sharing a radio frequency output power of a set of radio transceivers between antenna beams in a radio cell of a cellular network so as to split the radio cell into a plurality of split cells and thereby expand a channel capacity of the radio cell, the set of the radio transceivers being coupleable to a set of antenna ports of an antenna array, wherein each radio transceiver is configured to drive an associated antenna port when each radio transceiver is coupled to its associated antenna port, the method comprising:
providing each radio transceiver with a set of user signals that coordinate the driving of the antenna ports in order to control the antenna beams generated by the antenna array to create the plurality of split cells;
driving, by the set of radio transceivers, the antenna ports to generate at least two antenna beams comprising the plurality of split cells, wherein each radio transceiver contributes its radio frequency output power to all of the at least two antenna beams such that a fixed total radio frequency output power of the set of radio transceivers is adjustably distributed between the at least two antenna beams.

14. The method of claim 13, further comprising:
combining a set of amplitude weighted user signals to obtain a combined user signal; and
distributing the combined user signal to the set of radio transceivers,
wherein before being distributed to the set of radio transceivers, the combined user signal is passed through a vector modulation, which comprises vector parameter sets according to radio cells that the at least two antenna beams are assigned to.

15. The radio base transceiver station of claim 12, wherein the antenna device is configured to assign the antenna beams to radio cells according to one of the following cell configuration modes:
a vertical cell split mode, and
a horizontal cell split mode.

16. The radio base transceiver station of claim 12, wherein the combination unit comprises a set of weighting units configured to weight each user signal with a respective weight.

17. The radio base transceiver station of claim 16, wherein the set of the weighting units is configured to provide a user-individual amplitude coefficient to each user signal.

18. The radio base transceiver station of claim 17, wherein the combination unit comprises:
a summing unit configured to sum the weighted user signals, providing a sum user signal; and
a distribution unit configured to distribute the sum user signal to each of the radio transceivers.

* * * * *